United States Patent [19]

Vye

[11] Patent Number: 4,581,647
[45] Date of Patent: Apr. 8, 1986

[54] COMPUTERIZED AUTOMATIC FOCUSING CONTROL SYSTEM FOR MULTIPLE TELEVISION CAMERAS

[76] Inventor: Richard A. Vye, 2603 Centinela Ave., Apt. D, Santa Monica, Calif. 90405

[21] Appl. No.: 648,747

[22] Filed: Sep. 10, 1984

Related U.S. Application Data

[63] Continuation-in-part of Ser. No. 533,300, Sep. 19, 1983.

[51] Int. Cl.$^4$ ............................................. H04N 5/30
[52] U.S. Cl. .................................... 358/210; 358/209; 358/227
[58] Field of Search ........................ 358/209, 227, 210

[56] References Cited

U.S. PATENT DOCUMENTS

| | | | |
|---|---|---|---|
| 3,641,261 | 2/1972 | Chaplin et al. | 358/210 |
| 3,709,447 | 1/1976 | Devlin | 244/155 |
| 3,984,628 | 10/1976 | Sharp | 358/210 |
| 4,123,782 | 10/1978 | Kitahara | 358/210 |
| 4,152,722 | 5/1979 | Inuiya et al. | 358/102 |
| 4,321,625 | 3/1982 | Smith | 358/210 |
| 4,566,036 | 1/1986 | Kadosawa | 358/210 |

Primary Examiner—Gene Z. Rubinson
Assistant Examiner—Robert G. Lev
Attorney, Agent, or Firm—Keith D. Beecher

[57] ABSTRACT

A computerized control system for automatically focusing televison cameras used for televising a sporting, or other event, as the cameras are panned to follow the action, and as the cameras are zoomed in on the action. The system includes a digitizing tablet on which an observer follows the action by moving a stylus continuously or from point-to-point across the plane surface of the tablet. The resulting digital signals generated by the tablet are fed to a computer in which they are converted to digital focusing signals which are fed to the televison cameras. The computer is programmed so that it generates a different set of focus control digital signals for each camera as determined by the actual location of the individual cameras around the playing area. The digital focusing signals are converted to analog signals at each camera, and the analog signals are used at the individual cameras to activate a servo motor which controls the focus of the camera. Then, as each camera is panned and/or zoomed to follow the action, it is automatically maintained in focus. In a second embodiment, the digitizing tablet is transparent, and the operator observes the action on the playing area through the digitizing tablet.

10 Claims, 4 Drawing Figures

COMPUTERIZED AUTOMATIC FOCUSING CONTROL SYSTEM FOR MULTIPLE TELEVISION CAMERAS

This application is a continuation-in-part of copending application Ser. No. 533,300 filed Sept. 19, 1983.

BACKGROUND OF THE INVENTION

A multiplicity of television cameras are used at the present time to televise sporting events, such as football, basketball, golf and hockey games, as well as races, and the like. Each camera is monitored by a program editor, and the program editor determines the camera selection in order that the game in progress may be televised from the best camera angle and position as the action moves about the playing area.

Each cameraman pans his camera to follow the action, and he also zooms his camera into the point of action when appropriate in order to reproduce the action either on a close-up or long-shot basis, whichever is warranted at any particular time.

It is the present practice for the cameraman to adjust the focus of his camera manually as the camera is panned and whenever the zoom control is activated. The focus control usually comprises a manually operated mechanical, or electro-mechanical device mounted adjacent to the left of the two panning handles of the television camera, and the presentday television camera also usually includes a zoom control in the form of a second mechanical or electronically activated device adjacent to the right panning handle of the camera.

Then, as the cameraman pans his camera to follow the action on the playing field, he turns the focus control handle in an attempt manually to maintain the camera in focus during the panning operation. Also, when the cameraman zooms in on the action, he must also adjust the focus control to keep the camera in focus as closely as possible.

It is obvious that there are limits in the prior art to the ability of the cameraman manually to keep his camera in focus at all times, especially when the action is rapid and he is attempting to follow, for example, the flight of a ball or puck. In accordance with the present invention, the television cameras are all computer controlled so that each is automatically maintained in focus regardless of how fast moving the action may be, so that the cameraman need merely to pan his camera to follow the action, and to zoom in on the action, without any necessity to manually control the focus during any of these operations.

In broadcast sports television today, the prevailing practice is to place the cameras perpendicular to the general path of action so as to minimize focusing problems. However, this camera placement maximizes the necessary panning action of the cameras and introduces panning problems as the cameras attempt to follow rapid action. These problems include improper framing, or losing the action from the camera frame, or blurring the action due to panning at the wrong speed. One objective of the system of the invention is to overcome to a large extent the foregoing panning problems by permitting more favorable camera placements.

The system of the invention makes possible many exciting camera angles by following a ball or puck, for example, during a ball game or a hockey game, and for maintaining perfect focus at all times which is beyond the capabilities of the prior art manually focused cameras. In brief, the improved control system of the present invention serves to instantaneously and automatically maintain each television camera of a plurality of cameras used for televising a sporting event, and the like, in perfect focus as the cameras are panned and zoomed to follow the game action, so as to obviate any need for the cameraman to concern himself in any way with the focusing of his television camera.

The system of the invention has many significant advantages over manual focusing systems and existing automatic focusing systems which are based on energy reflection, optical cybernetics and multiple camera triangulation. These advantages include superior speed, greater accuracy, higher resolution, greater flexibility, cost effectiveness and multiple camera capability.

Speed, as referred to above, refers to the ability of a system to operate quickly enough to maintain critical focus as cameras follow continuous rapid action, and in the case of discontinuous activity, to have the cameras already in focus as they pan to and/or zoom in on the new area of activity.

An advantage of the computerized automatic multiple camera-focusing system of the present invention lies in the ability of the operator, one who is knowledgeable in the particular sport, to anticipate and/or to react to rapid and capricious movements, and to effect the proper input to the computer by the digitizing tablet, which then immediately focuses the involved cameras. Such an operator can quickly manipulate the "depth-of-field" in the direction of the activity so that both the desired object and its eventual destination can be in focus rather than just one or the other.

The prior art optical cybernetic focusing system is unsatisfactory in rapid action sport situations because the system relies on error input in order to initiate correctional procedures. Objects moving rapidly toward or away from a camera will always be somewhat out of focus because of the lag time involved in the cybernetic system. Also, the destination of the moving objects will be out of focus as they come into frame. When cameras pan to and/or zoom in on objects far from the original focus point, the objects will be out of focus before the cybernetic correctional processes are initiated properly to focus them.

The speed of the computerized automatic multiple camera focusing system of the present invention is greater than prior art systems and camera operators because the input to the computer eliminates the tendency to wait for focusing errors to manifest. This is accomplished by the system of the invention by anticipating and/or reacting to the true direction of action and inputting that directionality as it is happening so as to maintain a sharp focus on the proper object and its eventual destination without any error signal correctional lag.

An automatic focusing control system based on energy reflection is suitable for tracing rockets heading for space, but is unsuitable in conjunction with sporting events. The accuracy of the prior art mechanical multiple-camera triangulation system depends on the concerted skill of three or more camera operators, all accurately framing the proper subject. They are constrained by looking through their lenses into viewfinders. If one or more of the operators loses the object, the entire system goes out of focus.

The computerized automatic multiple camera focusing system of the present invention, using human intelligent inputs, is exceedingly accurate. Wherever the action in reality is, or is about to be, the operator moves the electronic pen on the tablet. Lenses are never accidentally set at infinity, nor are they set to focus on irrelevant foregrounds leaving the true objects of focus and their destinations blurred.

SUMMARY OF THE INVENTION

A computerized automatic multiple-camera focusing system which comprises a computer-controlled lens-motor drive that receives input from a human-operated digitizing tablet equipped with an electronic stylus for tracing continuous action taking place on a playing field.

DETAILED DESCRIPTION OF THE ILLUSTRATED EMBODIMENTS

Figure 1:
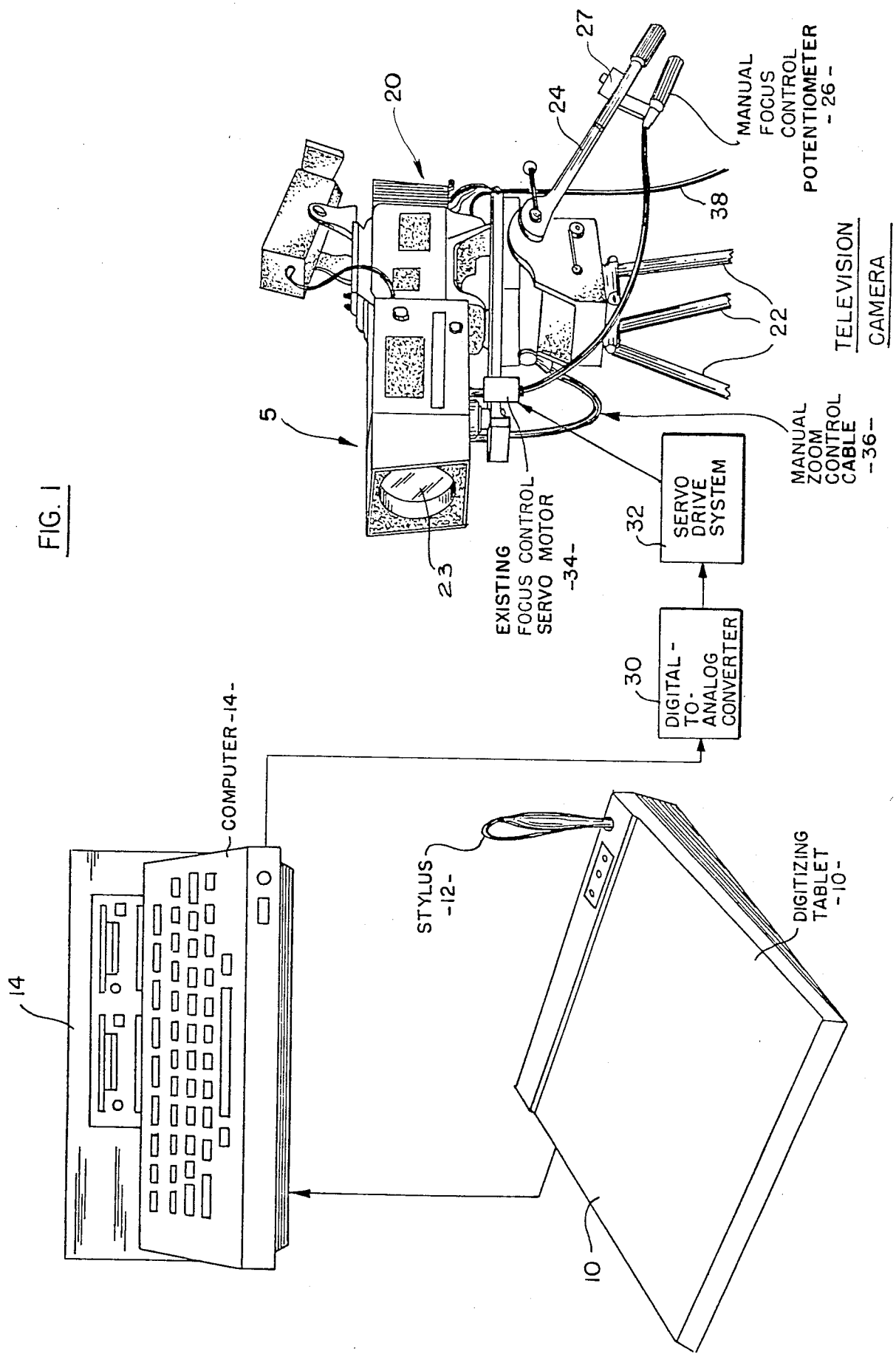
FIG. 1 is a schematic representation of an elemental system illustrative of the concepts of the present invention.

As shown, for example, in FIG. 1 the system of the invention may include a digitizing tablet 10. The digitizing tablet may be any commercially available tablet, such as the "Tiger Tablet" presently being marketed by Hitachi America, Ltd. of Torrance, Calif.

The digitizing tablet 10 is equipped with a stylus 12 which is intended to moved manually across the playing surface presented by the top of the tablet. As the stylus is moved across the plane surface, the tablet generates digital signals representative of the ordinate and coordinate positions of the stylus.

These digital signals are fed to a computer 14 which may be any commercially available computer, such as, for example, the Sony SMC70, which is presently being marketed by Sony Electronics Corporation of Inglewood, Calif.

The computer 14 responds to the digital signals from the digitizing tablet 10 to produce focusing control digital signals for a multiplicity of television cameras, such as a television camera 20. Television camera 20 is pivotally mounted on a tripod 22 which is equipped with a lens designated 23 contained in a lens cover 25. The television camera also includes a pair of angularly spaced handles, such as handle 24 by which the cameraman may rotate the camera about the vertical axis of the tripod for panning purposes. The camera 20 also includes a conventional zoom control servomotor for its lens 23 which is contained within lens cover 25, and which is manually adjusted by a zoom control potentiometer (not shown) mounted adjacent to the right-hand panning handle (not shown). The zoom control potentiometer is connected to the servomotor by a cable 26. The camera also includes a conventional focus control servomotor 34 for its lens 23 which is normally mounted within lens cover 25, and which is controlled by a focus control potentiometer 26 mounted adjacent to the lefthand panning handle 24.

The cameraman follows the action with camera 20 by turning the camera about the vertical axis of tripod 22 by the panning handles 24, so that the camera may pan the action as it moves about the playing area. Also, the cameraman may zoom in on the action by operating the zoom control potentiometer. At all times, as the camera is panned and/or zoomed, the cameraman must turn the focus control handle to maintain the camera in focus, insofar as the prior art cameras are concerned. Camera 20, for example, may be an Ikegami camera designated HK-257A, which are available from Ikegami Electronics (U.S.A.) Inc., Maywood, N.J. Lens 20A may be a Fujinon R44×13.5 ESM BCTV zoom lens available from Fujinon, Inc., Scarsdale, N.Y.

In accordance with the present invention, the digital focus signals from computer 14 are converted to corresponding analog signals in a digital-to-analog converter 30 which is connected to the computer. The resulting analog signals from converter 30 are introduced to a servo drive system 32 which, in turn, controls the existing camera lens focus control servo motor 34, so that the focus of the camera lens may be controlled automatically. The manual focus control potentiometer 26 provides a manual focus control override, if so desired, when the cameraman actuates an enable/disable switch 27 adjacent to switch focusing potentiometer 26.

The computer 14 is programmed to respond to the digital signals from tablet 10 and to calculate corresponding focus control signals for camera 20, as determined by the actual location of camera 20 with respect to the playing area.

During the progress of the sporting or other event, an observer watching the event moves stylus 12 across the plane surface of digitizing tablet 10. Computer 14 responds to the digital signals generated by tablet 10 to generate focus control digital signals in response thereto as determined by the position of camera 20 with respect to the sporting event. The focus control digital signals from the computer are converted into analog signals by converter 30, and the servo drive system 32 responds to the analog signals to drive servo motor 34 which, in turn, holds the camera in focus as it is panned to follow the action on the field.

Figure 2:
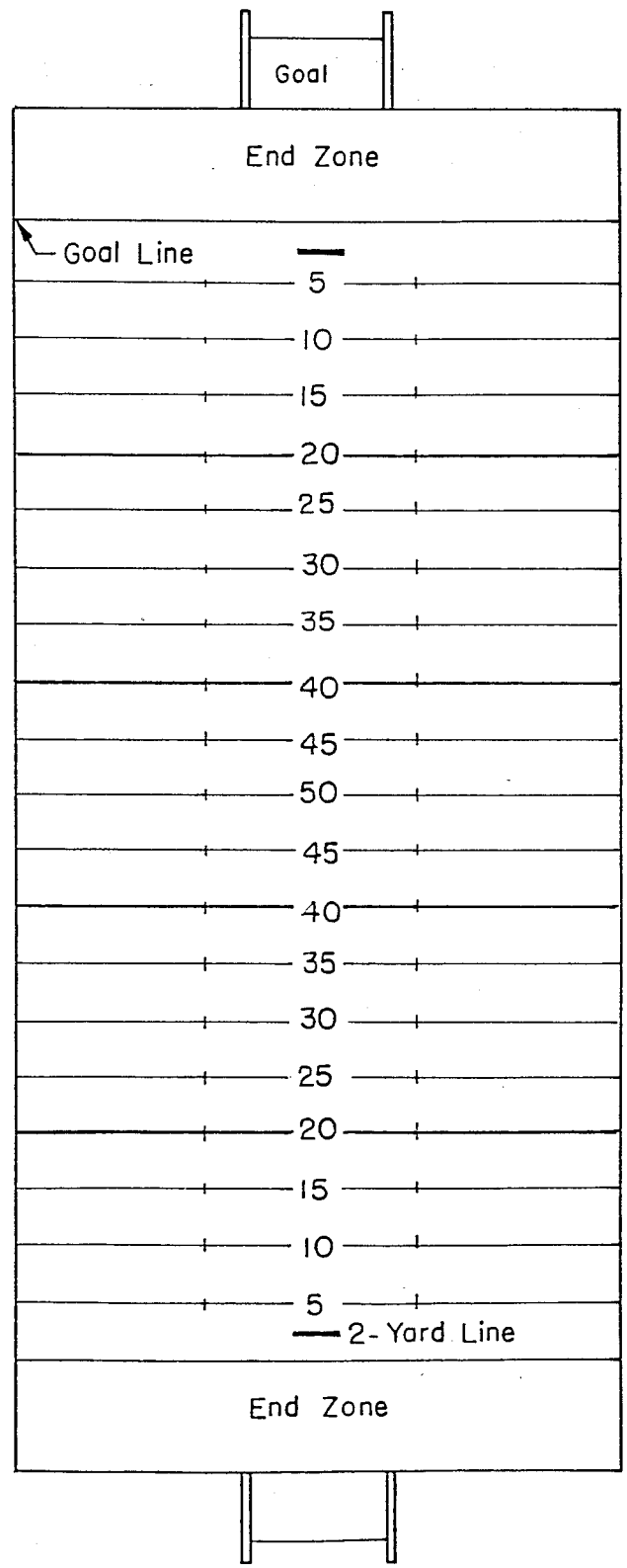
FIG. 2 shows an overlay which may be placed over the top of a digitizing tablet included in the system of FIG. 1, and which is representative of the playing area of the particular game being televised.

As shown in FIG. 2, an overlay 50 bearing inscriptions corresponding to the playing field of the particular sporting event being televised is placed over the plane surface of tablet 10. In the particular illustration of FIG. 2, the sporting event is a football game. It is pointed out that other overlays are provided for other sporting events. The overlay permits the observer following the action on the playing area to move stylus 12 across the plane surface of tablet 10 to different positions on the overlay 50, so that the action on the field may be followed by the stylus.

The cameraman operating camera 20 is also following the action with his camera, and his camera is automatically focused by the positioning of the stylus on the overlay.

Figure 3:
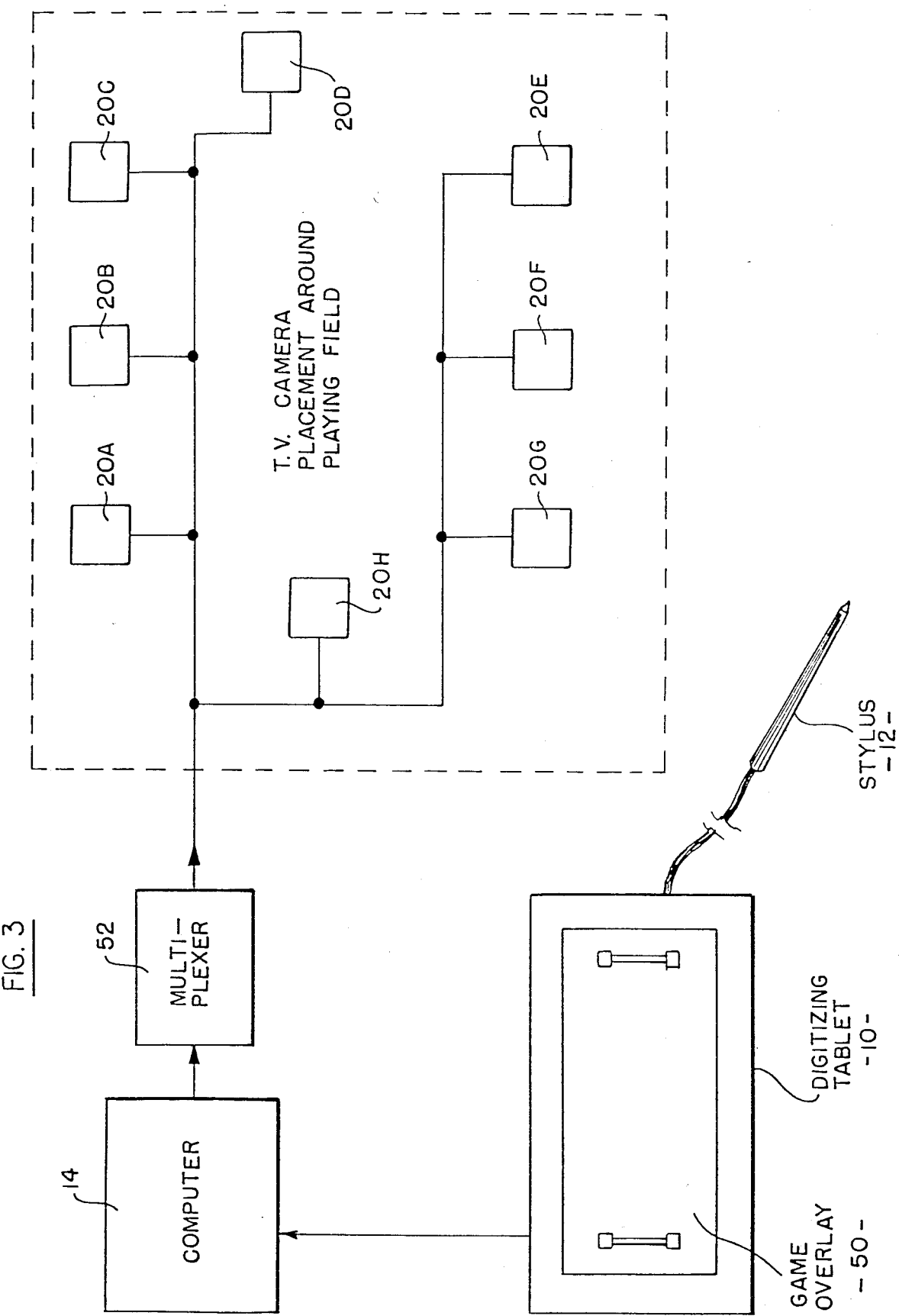
FIG. 3 is a block diagram of an automatic focusing control system incorporating the principles and concepts of the invention.

In the block diagram of FIG. 3, computer 14 is shown as controlling a plurality of television cameras designated 20A–20H which are positioned around the playing area at pre-selected positions. The position of each of the television cameras is related to a selected coordinate system, and the individual positions are programmed into computer 14. Then, as the stylus 12 is moved across the overlay 50, the digital signals generated by tablet 10 are converted in the computer to different sets of focusing signals, one set being used for each of the various cameras. The resulting digital focusing signals may be transmitted separately to the various cameras, or, as shown in FIG. 3, may be multiplexed in a multiplexer 52, and transmitted over a single cable to the cameras.

In operating the system of FIG. 3, the cameraman for each of the cameras 20A–20H follows the action with his camera by appropriate panning and zooming operations. At the same time, the observer follows the action with stylus 12 on game overlay 50. The computer responds to the digital signals from digitizing tablet 10 to provide focusing control signals for each of the television cameras 20A–20H so that each camera is automatically maintained in focus as it is panned and zoomed by its cameraman.

Figure 4:
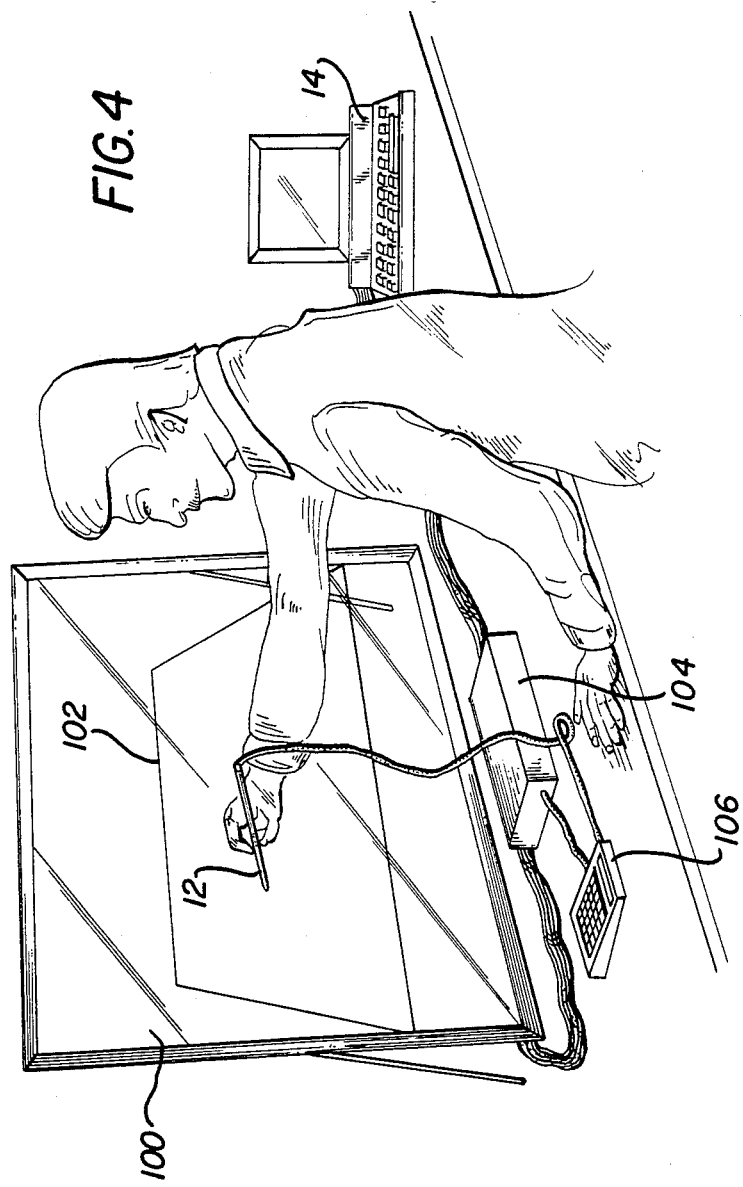
FIG. 4 shows a second embodiment of the system of the invention in which the digitizing tablet is transparent and the playing area is viewed through the tablet.

In the embbdiment of FIG. 4, the digitizing tablet 10 is replaced by a transparent digitizing tablet 100 which may be a high resolution Scriptel digitizing tablet having height and width dimensions, for example, of 24"×36" and a resolution of the order of 864 million X/Y coordinates. The operator observes the action on the sports field through the transparent digitizing tablet 100, and follows the action on a three-dimensional representation, which in this case is in the form of a trapezoid 102 by the stylus 12. The stylus is capable, for example, of feeding 200 coordinate pairs per second through a microprocessor 104 to computer 14. Microprocessor 104 may be a central processing unit of the type designated 8088. The computer 14 processes the data as in the previous embodiment, and transmits corresponding digital signals by hard wire or multiplexed over existing triax cable to the cameras at, for example, a data rate of 200 bytes per second per camera. As described above, the digital signals are converted at each camera into analog servo signals by appropriate analog converters.

A numeric key pad 106 is included in the system for actuating pre-programmable focus locations.

With the transparent tablet 100, it is possible for the operator to look directly at the live action and to trace the action directly with stylus 12 on the digitizer which, as shown in FIG. 4, is vertically positioned in front of the operator. Placing the stylus 12 directly on what the operator actually sees focuses all the cameras linked to the computer 14 exactly on that spot. In the embodiment of FIG. 4, it is not necessary for the operator to look up-and down between the action and the tablet as is the case in the embodiment of FIG. 1.

The computer may respond to voice-activated commands from the operator which causes it to activate the lens focusing controls in much the same way as moving the stylus or pressing the key pad buttons. For example, in observing a baseball game, the operator may say "centerfield" and the computer would then cause the lenses of the system to focus on the normal location of the centerfielder.

In addition, each independent camera operator may have the option of manually switching to a separate voice-activated computer. Thus, if the centerfielder, for example, is running back toward the wall to catch a fly ball, the command "farther" would focus the lens of that particular camera in increments of a specified number of feet.

The invention provides, therefore, a computerized multi-television automatic focusing control system which serves to maintain each of a multiplicity of television cameras automatically and instantaneously in focus, as the cameras are moved to follow the action on the playing area. As mentioned above, the use of the automatic system of the invention, in addition to maintaining perfect focus for all normal shots of the action, also enables exciting camera angles to be used to follow, for example, a moving ball or puck, while maintaining the object in focus at all times.

It will be appreciated that while particular embodiments of the invention have been shown and described, modifications may be made. It is intended in the claims to cover all modifications which come within the true spirit and scope of the invention.

I claim:

1. A computerized focusing control system for a television camera, and the like, used for televising a sporting, or other event, in a particular play area, said system comprising: a stylus moveable across a plane surface to selected ordinate and coordinate positions; means for generating digital signals representative of the coordinate and ordinate positions of the stylus with respect to the plane surface; a computer connected to said generating means and responsive to the digital signals therefrom for generating focus control signals for at least one television camera, said computer being programed so that said focus control signals correspond to the position of the camera with respect to the play area of the sporting event being televised; a television camera having an adjustable focus control; and an automatic focusing servo drive system connected to the focus control of the television camera and to the computer and responsive to the focus control signals from the computer for automatically controlling the focus of the television camera.

2. The system defined in claim 1, in which said generating means comprised a digitizing tablet having a plane surface and said stylus is moveable over the plane surface of the tablet.

3. The system defined in claim 2, in which said generating means also includes a key pad for actuating focusing to pre-programmable focus locations.

4. The system defined in claim 1, in which said computer responds to voice-actuated commands to actuate focusing to pre-programmable focus locations.

5. The system defined in claim 2, and which include an overlay for the plane surface of the digitizing tablet simulating the play area of the sporting event being televised.

6. The system defined in claim 1, and which includes a digital-to-analog converter connected to the computer for converting the focus control digital signals from the computer into corresponding analog signals for the servo drive system.

7. The system defined in claim 1, and which includes a plurality of television cameras selectively positioned around the play area of the sporting event and each having an adjustable focus control, in which said computer generates different focus control signals for each of said television cameras, and in which each of said television cameras includes a servo drive system connected to the focus control thereof and to the computer and responsive to the focus control signals from the computer corresponding to that camera for automatically controlling the focus of that camera.

8. The system defined in claim 7, in which each camera includes a digital-to-analog converter connected to the computer for converting the focus control digital signals received from the computer into corresponding analog control signals for the corresponding servo drive system.

9. The system defined in claim 7, and which includes multiplexing means for transmitting the focus control digital signals to the television cameras over a common line.

10. The system defined in claim 2, in which the digitizing tablet is transparent and adapted to be positioned so that a person operating the stylus can view the play areas of the sporting event directly through the tablet.

* * * * *